US010797374B1

(12) United States Patent
Tengler et al.

(10) Patent No.: US 10,797,374 B1
(45) Date of Patent: Oct. 6, 2020

(54) AUTOMOTIVE GLASS ANTENNA WITH FIXED AND MOVING PORTIONS

(71) Applicant: FORD GLOBAL TECHNOLOGIES, LLC, Dearborn, MI (US)

(72) Inventors: David R. Tengler, Beverly Hills, MI (US); Steve S. Sesi, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/442,808

(22) Filed: Jun. 17, 2019

(51) Int. Cl.
*H01Q 1/12* (2006.01)
*H01Q 1/32* (2006.01)
*E06B 3/46* (2006.01)
*B60J 1/18* (2006.01)
*H05B 3/84* (2006.01)

(52) U.S. Cl.
CPC .......... *H01Q 1/1278* (2013.01); *B60J 1/1846* (2013.01); *E06B 3/4618* (2013.01); *H01Q 1/325* (2013.01); *H05B 3/84* (2013.01)

(58) Field of Classification Search
CPC .... H01Q 1/12; H01Q 1/32; B60J 1/18; H05B 3/84; E06B 3/46
USPC ........................................................ 343/713
See application file for complete search history.

(56) References Cited

U.S. PATENT DOCUMENTS

| 4,897,643 | A | * | 1/1990 | Shibata | H01Q 1/1271 340/5.61 |
| 5,610,618 | A | * | 3/1997 | Adrian | H01Q 1/1271 343/711 |
| 6,239,758 | B1 | | 5/2001 | Fuchs et al. | |
| 8,707,624 | B2 | | 4/2014 | Gipson et al. | |
| 9,642,187 | B2 | | 5/2017 | Snider et al. | |
| 9,797,177 | B2 | | 10/2017 | Gipson | |
| 10,011,159 | B1 | * | 7/2018 | Salter | B60J 1/1838 |

OTHER PUBLICATIONS

Brendan D. Pell, et al., Advancements in Automotive Antennas, New Trends and Developments in Automotive System Engineering, Prof. Marcello Chiaberge (Ed.), ISBN: 978-953-307-517-4, (2011) pp. 513-538.

* cited by examiner

*Primary Examiner* — Andrea Lindgren Baltzell
(74) *Attorney, Agent, or Firm* — Frank L. Lollo; MacMillan, Sobanski & Todd, LLC

(57) ABSTRACT

An automotive vehicle has a fixed glass panel with an aperture and a sliding glass panel mounted to the fixed glass panel adapted to selectably cover the aperture. The glass panels carry a heater grid having a plurality of vertical bus bars interconnected by a plurality of horizontal defrost traces. The bus bars are configured to be selectably connected to a power supply for providing resistive heating. The sliding glass panel is limited to a plurality of restricted positions. Each restricted position has at least one bus bar on the sliding glass panel overlapping one of the bus bars on the fixed glass panel to provide capacitive coupling between the overlapping bus bars of RF signals impinging on the horizontal traces. An antenna coupler connected to a bus bar on the fixed glass panel transmits the RF signals to an RF receiver.

14 Claims, 5 Drawing Sheets

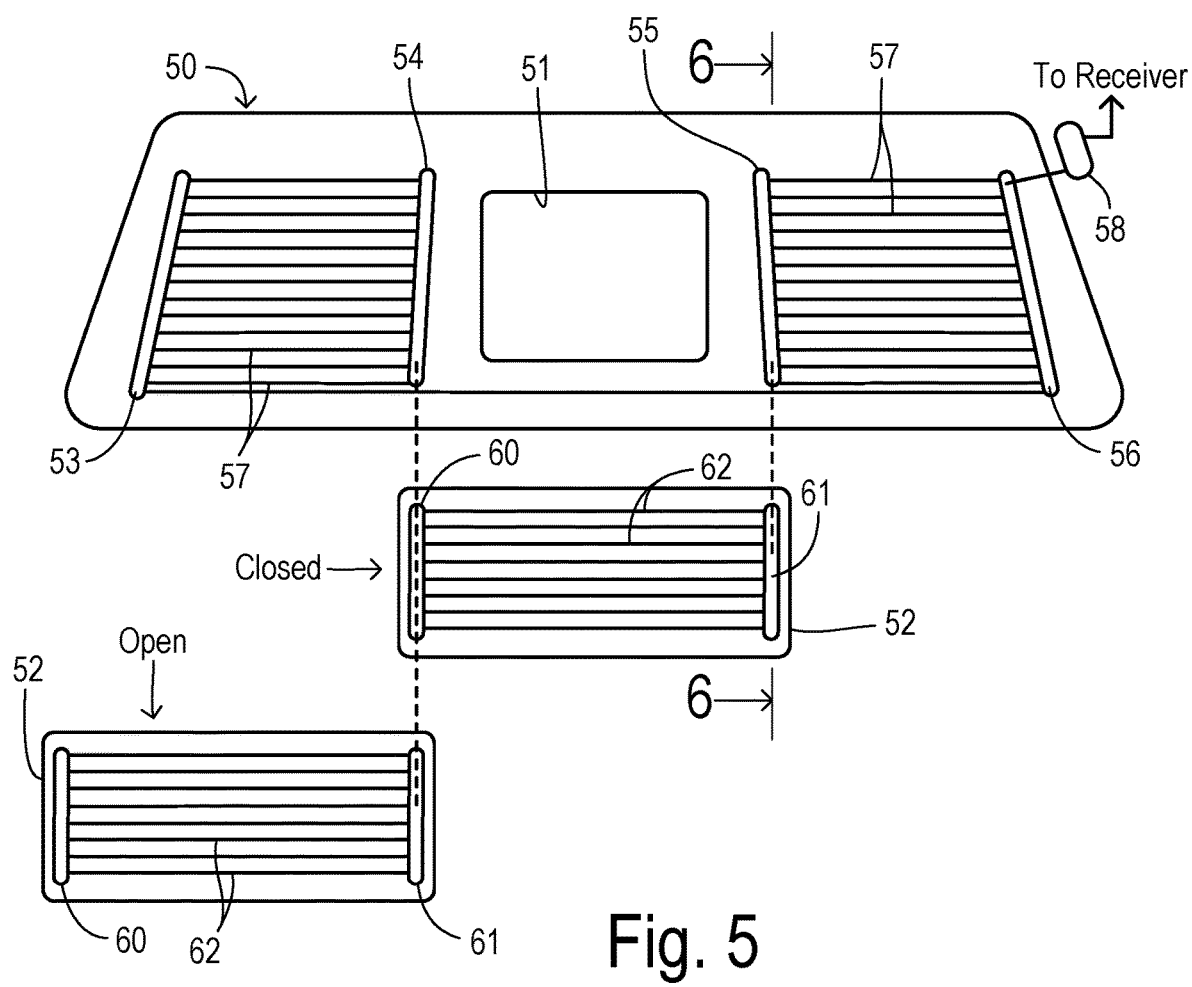
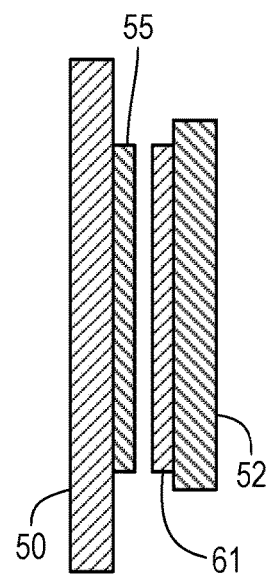

AUTOMOTIVE GLASS ANTENNA WITH FIXED AND MOVING PORTIONS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to antennas for automotive vehicles, and, more specifically, to on-glass antenna structures occupying increased surface area including sliding window panels.

Although whip or aerial antennas can provide very good reception for mobile RF receivers on motor vehicles, they are reluctantly used because of disadvantages such as wind noise, aerodynamic drag, detracting from the styling of the vehicle body, and exposure to mechanical damage. Instead, RF antennas are typically implemented as "concealed" antennas formed as conductive traces integrated with glass windows of a vehicle passenger cabin (e.g., a windshield or a rear window, also referred to as a backlite). Often, the same conductive traces can be used simultaneously for an antenna and a glass-mounted defroster which provides resistive heating.

One potential issue with on-glass antennas concerns poor reception performance under weak field strength conditions. One factor that limits the performance of such antennas is the limited surface area that may be available for accommodating the antenna. The largest glass panel of a vehicle is typically comprised of the windshield. The heightened need to maintain good visibility through the windshield, however, limits the acceptable areas for antenna placement and the types of conductive traces that can be used. Therefore, it is generally preferred to use side windows, the backlite, and/or roof glass (e.g., a sunroof or moon roof) for carrying an antenna.

The second largest glass panel of a vehicle is typically the backlite. For certain types of vehicles such as pickup trucks, a rear backlite may be interrupted by a center opening which is selectably covered by a sliding glass panel to allow ventilation of the passenger compartment via the opening. Consequently, the area available for implementing an antenna on the rear backlite of a pickup truck has been further restricted (i.e., limited to the fixed, unmovable portions of the window).

SUMMARY OF THE INVENTION

Certain embodiments of the invention allows for the use of a fixed piece of glass in addition to a moving piece of glass to provide an antenna, such as an AM/FM/DAB antenna. The invention may preferably ensure that the glass movement is restricted to certain predetermined locations, wherein each location provides a predictable, beneficial reception performance (e.g., antenna gain and directionality) and a signal path for conducting RF signals from the moving glass panel to the fixed glass panel. All or part of the conductive traces for the antenna can also function as part of a defroster grid.

In one aspect of the invention, an antenna system for an automotive vehicle comprises a fixed glass panel mounted in a window frame of the vehicle having an aperture and a sliding glass panel adapted to cover the aperture. A rail system is mounted to the fixed glass panel for slidably retaining the sliding glass panel at and between a plurality of restricted positions including a closed position and a maximum open position. A first plurality of conductive traces are disposed on the fixed glass panel forming fixed antenna segments responsive to RF broadcast signals, wherein the first plurality of conductive traces include at least a first bus bar proximate an edge of the aperture. A second plurality of conductive traces are disposed on the sliding glass panel forming sliding antenna segments responsive to the RF broadcast signals, wherein the second plurality of conductive traces include at least a second bus bar arranged to overlap the first bus bar when the sliding glass panel is in one of the restricted positions to provide capacitive coupling between the first and second bus bars for the RF broadcast signals.

BRIEF DESCRIPTION OF THE DRAWINGS

FIG. 5 is an exploded view showing conductive traces on a fixed glass panel and a movable glass panel, wherein bus bars on the panels are aligned for open and closed positions of the movable panel.

FIG. 6 is a side, cross-sectional view along line 6-6 in FIG. 5.

DETAILED DESCRIPTION OF PREFERRED EMBODIMENTS

Figure 1:
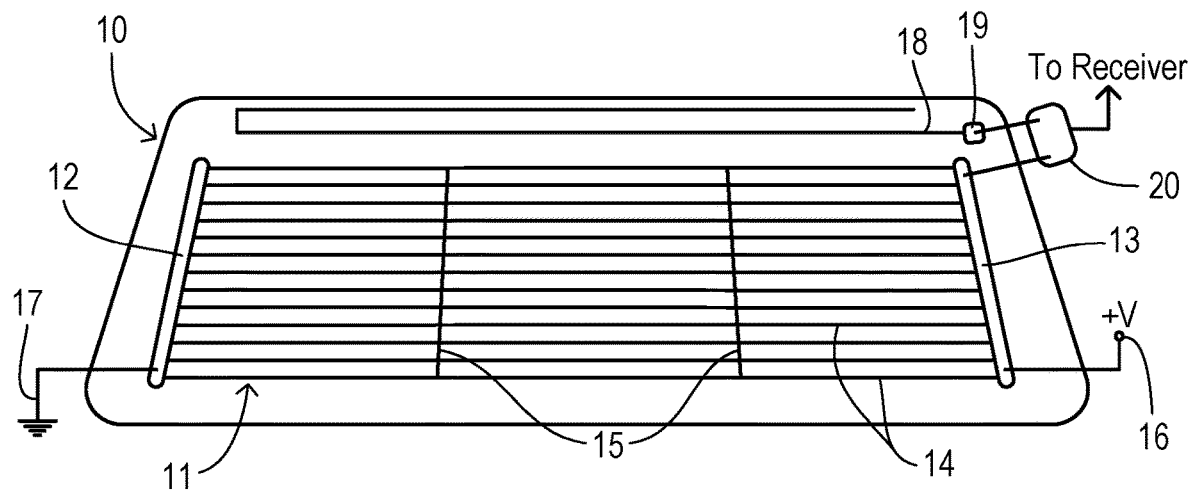
FIG. 1 is a plan view showing an integrated heater grid and antenna on a glass window panel.

Referring to FIG. 1, an automotive glass panel 10 (e.g., a windshield or backlite) carries a defroster grid 11 as well known in the art. Grid 11 is comprised of conductive traces which may be embedded between laminated layers or applied to an inside surface of glass panel 10. Grid 11 includes generally-vertical bus bars 12 and 13 interconnected by a plurality of thin horizontal conductor traces 14. Traces 14 may be interconnected by vertical equipotential lines 15 for balancing the current flow. Bus bar 13 is connected with an input terminal 16, and bus bar 12 is connected to vehicle ground 17. When a DC voltage is applied to terminal 16, resistive heating is generated by current flow through traces 14.

For purposes of implementing on-glass antennas, RF broadcast signals can be received using grid 11 and/or a separate conductive trace 18 applied to glass panel 10. Antenna trace 18 has a connector pad 19 which is connected by a jumper wire to an antenna amplifier/coupler 20 for sending received RF signals to a receiver. Likewise, bus bar 13 may be connected to amplifier/coupler 20 to pass RF signals received at grid 11. As known in the art, grid 11 may be particularly beneficial for receiving FM broadcast signals while antenna trace 18 is optimized for receiving AM broadcast signals.

Figure 2:
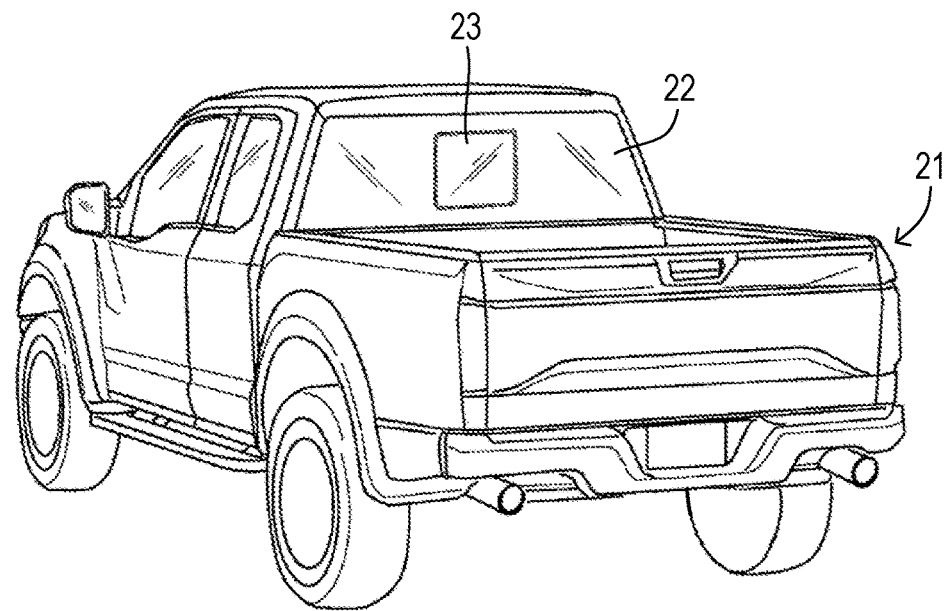
FIG. 2 is a rear perspective view of a pickup truck having a rear backlite with a sliding window panel.
Figure 3:
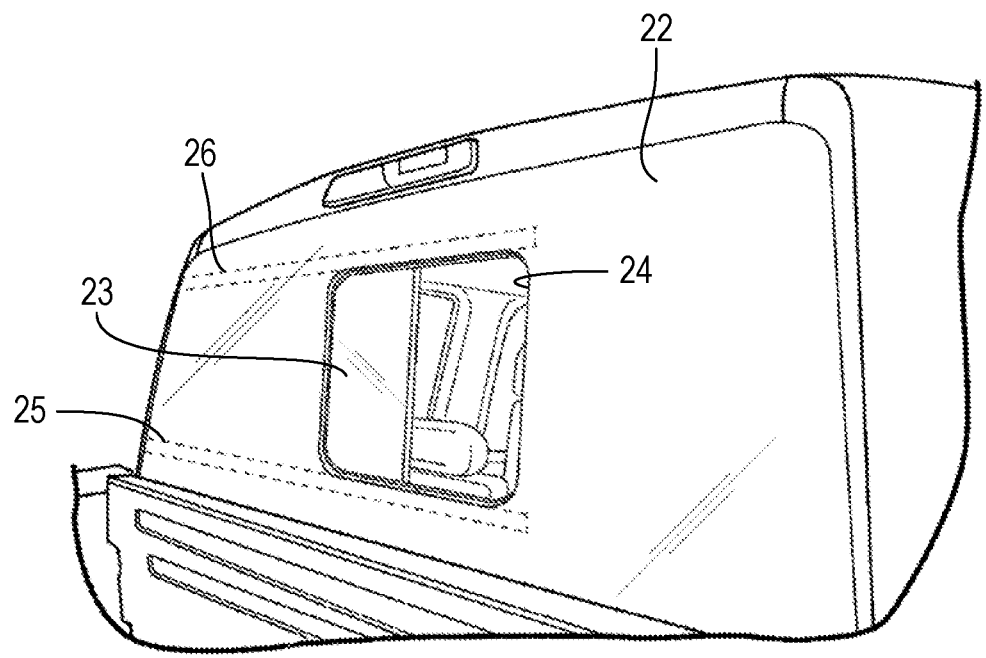
FIG. 3 is a perspective view showing the rear backlite and sliding window panel in greater detail.

For particular broadcast services, it may be desirable to utilize on-glass conductive traces covering relatively large surface areas in order to obtain the desired levels of antenna performance. However, for certain vehicle styles, it may be more difficult to dedicate sufficiently large areas of a glass panel for use as an antenna. FIGS. 2 and 3 show a conventional pickup truck 21 having a fixed rear window or backlite 22. Backlite 22 is stationary and has a center aperture 24. Backlite 22 carries a sliding window 23 to selectively cover center aperture 24. FIG. 3 shows sliding window panel 23 in a partially open condition as it slides along a rail system including rails 25 and 26 mounted on an inner surface of backlite glass panel 22.

Figure 4:
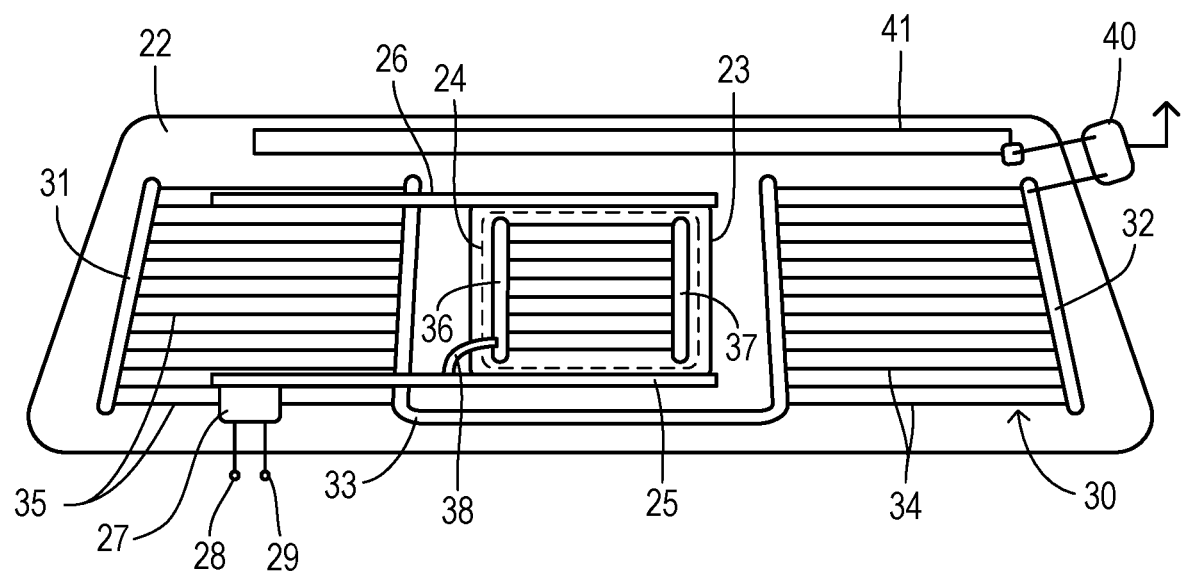
FIG. 4 is a plan view showing further details of a conventional rear backlite having integrated heater/antenna traces and an automatic sliding window actuator.

FIG. 4 is an interior view of glass panel 22 revealing components for automatically controlling the position of sliding panel 23 and for providing defroster heating of both glass panels. Thus, sliding panel 23 is retained in rails 25 and 26, and an actuator 27 is integrated with rail 25 which interfaces with sliding panel 23 via a linkage (not shown) for automatically moving glass panel 23 according to commands received via an input terminal 28 from a controller (not shown). Actuator 27 may include a stepper motor or screw drive as known in the art. Actuator 27 preferably incorporates a position sensor for providing a position signal via an output terminal 29. Terminals 28 and 29 are coupled to the controller and user interface (not shown) as known in the art.

Fixed glass panel 22 includes a grid 30 of conductive traces for implementing a defroster. Bus bars 31 and 32 are provided at opposite ends of fixed glass panel 22. A U-shaped center bus bar 33 is disposed around a periphery of opening 24 to convey current from a first set of conductive heating traces 34 on one side of aperture 24 to a second set of conductive heating traces 35 on the other side of aperture 24. Sliding window panel 23 also carries conductive traces for forming a defroster including bus bars 36 and 37. A flexible cable 38 is provided for connecting with bus bars 36 and 37 to selectively deliver electrical power to the heating traces via rail 25. The defrost grid on sliding panel 23 is typically connected in parallel with the defrost grid on fixed panel 22.

In the known system of FIG. 4, conductive traces on fixed panel 22 have also been utilized as antenna structures wherein an antenna amplifier coupler 40 is connected to bus bar 32 for receiving a first RF broadcast band. Separate antenna trace 41 may also be connected with coupler 40 to provide reception for a second RF broadcast band. Due to the separate power connection for a portion of the defroster grid on sliding glass panel 23, however, traces on sliding glass panel 23 have not been used as antenna elements for receiving RF signals.

In the present invention, the surface of a sliding glass panel can be used as elements of an RF antenna as a result of arranging various bus bars on the fixed and sliding glass panels to become aligned at certain restricted positions or orientations in order to achieve capacitive coupling of RF signals between the panels. At each of the restricted positions, the resulting configuration of the capacitively-coupled antenna elements intentionally exhibits a targeted antenna performance.

FIG. 5 shows a first embodiment of the invention wherein a fixed glass panel 50 for mounting within a window frame of a vehicle has an aperture 51. A sliding glass panel 52 is adapted to cover aperture 51 and to slide between closed and open positions depicted in FIG. 5. In particular, panel 52 slides within a rail system (not shown) that slidably retains sliding glass panel 52 at and between a plurality of restricted positions. Fixed panel 50 has a plurality of conductive traces forming a defrost heater grid including vertical bus bars 53, 54, 55, and 56 interconnected by horizontal traces 57. Bus bars 54 and 55 are disposed on opposite sides of aperture 51, so that each is available for establishing a capacitive coupling as described below. The conductive traces are further utilized as antenna elements which connect with an antenna coupler 58 for providing RF signals to a receiver.

Sliding panel 52 has a plurality of conductive traces including generally vertical bus bars 60 and 61 interconnected by horizontal traces 62. Electrical power connections to the various bus bars on glass panels 50 and 52 are conventional, so they are not depicted. The conductive traces including bus bars 60 and 61 and horizontal traces 62 on sliding glass panel 52 further operate as antenna segments responsive to RF broadcast signals. Due to the placement of at least one of bus bars 60 and 61 in an overlapping alignment with at least one busbar 54 or 55 on the fixed glass panel 57 when in a restricted (i.e., allowed) position, the RF signals picked up on sliding panel 52 can propagate over to the conduct conductive traces on fixed panel 50 via capacitive coupling so that they contribute to the RF signals coupled to the receiver via antenna coupler 58. In particular, with sliding panel 52 at the closed position then bus bar 60 overlaps with bus bar 54 while bus bar 61 overlaps with bus bar 55 (i.e., capacitive coupling can occur at both sides simultaneously). Sliding panel 52 can also be moved into a fully open position wherein bus bar 61 overlaps bus bar 54. By restricting the operative position of sliding glass panel 52 to the pre-defined restricted positions, a capacitive coupling between at least one pair of bus bars located on the fixed and sliding glass panels can be assured. Consequently, antenna signals received on sliding panel 52 are able to propagate to the receiver.

As shown in FIG. 6, when bus bars 55 and 61 are in an overlapping arrangement (because sliding panel 52 is in the closed position), they are in close proximity with only a small air gap between them. Thus, bus bars 55 and 61 function as capacitive plates which interact to produce capacitive coupling of the antenna elements formed by the conductive traces on sliding panel 52 with the conductive traces on fixed panel 50.

Figure 7:
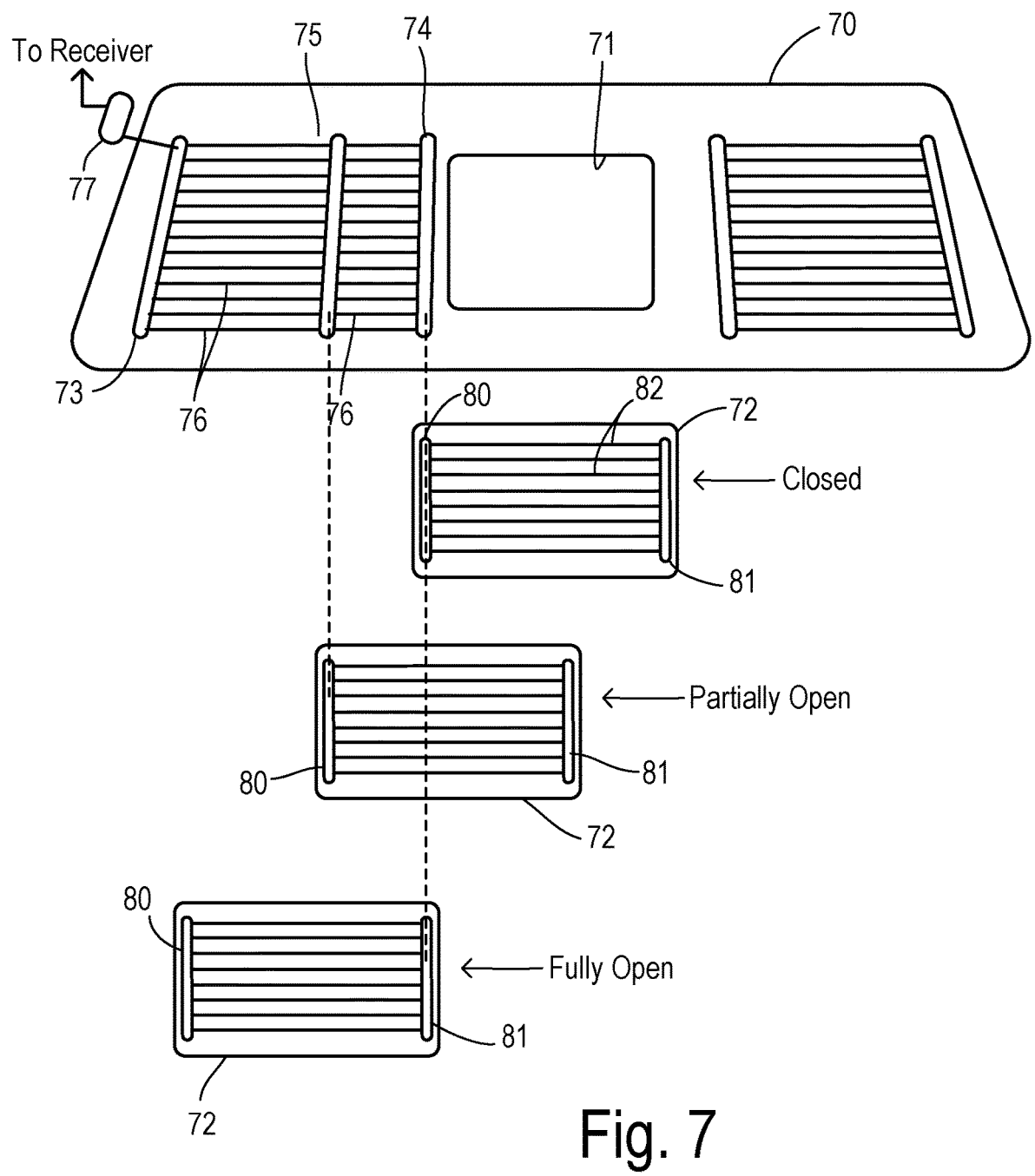
FIG. 7 is an exploded view showing conductive traces on a fixed glass panel and a movable glass panel, wherein bus bars on the panels are aligned for a fully open, position, a partially-open position, and a closed position of the movable panel.

The embodiment in FIG. 5 achieves two restricted positions since the overlapping of bus bars occurs only at the fully open and fully closed positions. By addition of one or more bus bars which come into pairwise overlapping alignments at other intermediate positions of the sliding glass panel, additional restricted positions can be obtained. The added bus bars can appear on either the fixed glass panel or sliding glass panel. As shown in the embodiment of FIG. 7, a fixed glass panel 70 has an aperture 71 selectively covered by a sliding glass panel 72. Fixed glass panel 70 includes conductive traces forming a heater grid with vertical bus bars 73, 74, and 75 interconnected by horizontal conductive traces 76. Bus bar 73 is connected with an antenna coupler 77 to provide antenna signals to a receiver. Bus bars 73 and 74 are fed with electrical power to perform resistive heating, while busbar 75 is present only to provide capacitive coupling for an additional restricted position.

Sliding glass panel 72 includes generally vertical bus bars 80 and 81 interconnected by horizontal traces 82. Bus bars 80 and 81 are fed with electrical power in a conventional manner for performing resistive heating. In addition, bus bar 80 selectively overlaps with bus bar 74 in a closed position and with bus bar 75 in a partially open position. Bus bar 81 moves into an overlapping alignment with bus bar 74 when sliding panel 72 is in a fully open position. In each of these restricted positions, one respective pair of bus bars of the fixed and sliding glass panels comes into an overlapping arrangement to provide capacitive coupling of RF signals from sliding panel 72 to fixed panel 70.

Figure 8:
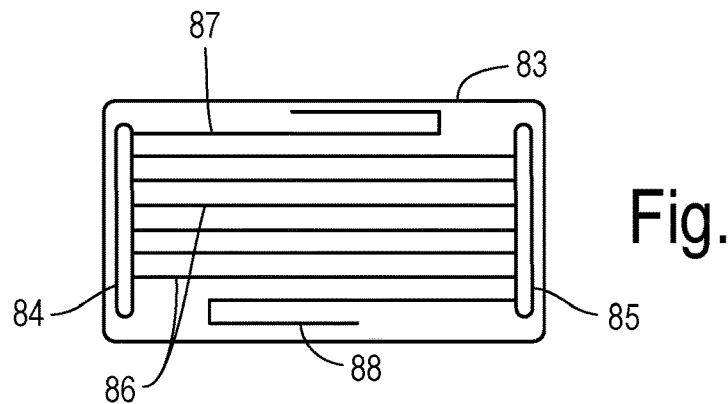
FIG. 8 is a plan view showing another preferred embodiment of conductive traces on a slidable glass panel.
Figure 9:
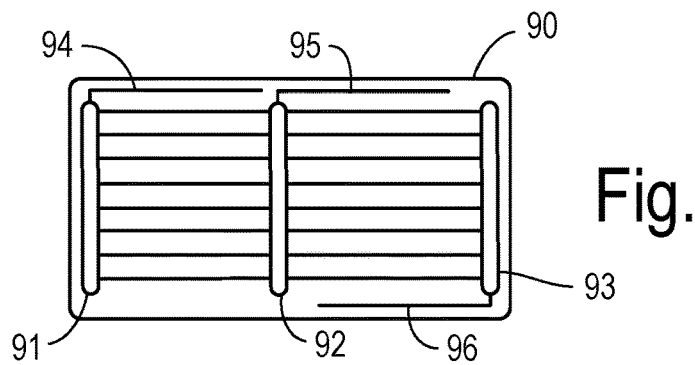
FIG. 9 is a plan view showing yet another preferred embodiment of conductive traces on a slidable glass panel.
Figure 10:
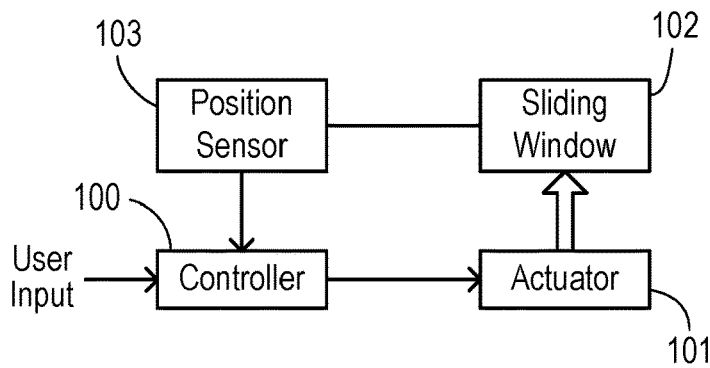
FIG. 10 is a block diagram showing a sliding window apparatus of the present invention.

In FIGS. 5 and 7, the sliding glass panel includes horizontal conductive traces of the heater grid acting as antenna elements. Additional conductive traces may be included on the sliding glass panel which provide add to a desirable antenna performance without participating in the resistive heating function. As shown in FIG. 8, for example, a sliding glass panel 83 has bus bars 84 and 85 connected by resistive heating traces 86. In addition, an antenna element 87 is formed by a conductive trace connecting with bus bar 84, and antenna element 88 is formed by a conductive trace connecting to bus bar 85. In FIG. 9, a sliding glass panel 90 includes generally vertical bus bars 91, 92, and 93. Electrical power for resistive heating is fed between bus bars 91 and 93. Busbar 92 is provided for obtaining an overlapping relationship with a bus bar on the fixed glass panel at corresponding restricted positions in a manner similar to the previously discussed embodiments. Each bus bar 91, 92, and 93 is also connected to a respective antenna element 94, 95, or 96 which are added according to a desired antenna pattern and do not participate in resistive heating.

In one preferred embodiment, the restriction of the window positions to the predetermined restricted positions is imposed according to pre-programmed operations of an automatic window actuator. Thus, a controller 100 receives a user input identifying a desired one of a plurality of restricted positions such as fully closed, fully open, and partially open positions wherein a respective overlapping condition occurs between bus bars as explained above. In response to an identified (i.e., commanded) position, controller 100 activates an actuator 101 for driving a sliding window 102. A position sensor 103 interacts with sliding window 102 to inform controller 100 when the desired restricted position has been obtained.

Figure 11:
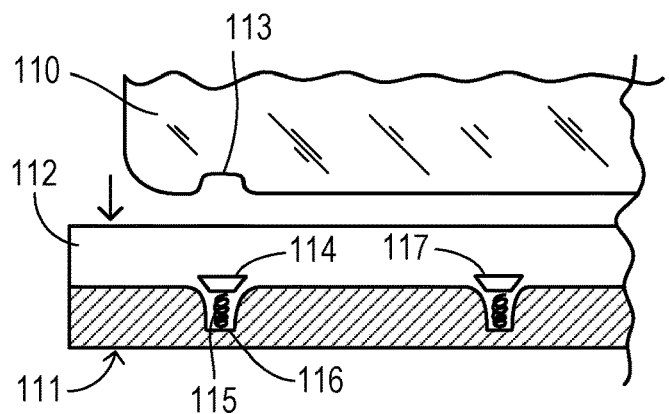
FIG. 11 is a partial cross-sectional view showing a locking mechanism for restricting the positioning of a sliding window according to one preferred embodiment.

Restricted positions can also be obtained in a manually-operated system by using a mechanical interlock which engages at the restricted positions to indicate proper placement. FIG. 11 shows a sliding glass panel 110 at a slightly exploded position above a channel 112 in a guide rail 111. Sliding panel 110 has a notch 113 along a bottom edge for interfacing with one or more spring-loaded plungers 114 and 117. Plunger 114 projects from a cavity 116 under the influence of a spring 115, thereby allowing plunger 114 to extend and retract vertically. When notch 113 aligns with plunger 114, then plunger 114 extends into notch 113 as an interlock to inform a user that a desired position has been obtained. The spring force of spring 115 is sufficiently low that a user can manually disengage the mechanical interlock when it is desired to move sliding glass panel 110 to a different restricted position.

What is claimed is:

1. An antenna system for an automotive vehicle, comprising:
    a fixed glass panel mounted in a window frame of the vehicle and having an aperture;
    a sliding glass panel adapted to cover the aperture;
    a rail system mounted to the fixed glass panel for slidably retaining the sliding glass panel at and between a plurality of restricted positions including a closed position and a maximum open position;
    a first plurality of conductive traces disposed on the fixed glass panel forming fixed antenna segments responsive to RF broadcast signals, wherein the first plurality of conductive traces include at least a first bus bar proximate an edge of the aperture; and
    a second plurality of conductive traces disposed on the sliding glass panel forming sliding antenna segments responsive to the RF broadcast signals, wherein the second plurality of conductive traces include at least a second bus bar arranged to overlap the first bus bar when the sliding glass panel is in one of the restricted positions to provide capacitive coupling between the first and second bus bars for the RF broadcast signals.

2. The antenna system of claim 1 wherein the first plurality of conductive traces includes a third bus bar, wherein the second bus bar is arranged to overlap the third bus bar when the sliding glass panel is in another one of the restricted positions.

3. The antenna system of claim 1 wherein the plurality of restricted positions further includes a predetermined partially-open position.

4. The antenna system of claim 1 wherein the first and second pluralities of conductive traces each includes a respective plurality of bus bars, wherein at least one respective pair of bus bars overlaps at each of the restricted positions.

5. The antenna system of claim 1 wherein the first and second pluralities of conductive traces are configured as a defrost grid for connecting to a power supply to perform resistive heating of the glass panels.

6. The antenna system of claim 5 wherein the second plurality of conductive traces on the sliding glass panel includes antenna segments not included in the defrost grid.

7. The antenna system of claim 1 further comprising an antenna amplifier directly connected to the first plurality of conductive traces on the fixed glass panel for coupling the RF broadcast signals to an RF receiver.

8. The antenna system of claim 1 wherein the rail system includes a powered actuator for controlling movement of the sliding glass panel, wherein the powered actuator is driven in a manner such that the sliding glass panel is stopped only at the restricted positions.

9. The antenna system of claim 1 wherein the rail system permits manually-controlled sliding of the sliding glass panel, and wherein the rail system includes a mechanical interlock engaging at the restricted positions to indicate proper placement at a restricted position.

10. Apparatus of a vehicle, comprising:
    a fixed glass panel having an aperture;
    a sliding glass panel mounted to the fixed glass panel and adapted to selectably cover and uncover the aperture;
    a heater grid comprised of 1) a plurality of vertical bus bars on the fixed glass panel interconnected by a plurality of horizontal defrost traces, and 2) a plurality of vertical bus bars on the sliding glass panel interconnected by a plurality of horizontal defrost traces, wherein the vertical bus bars on the fixed and sliding glass panels are configured to be selectably connected to a power supply for providing resistive heating, wherein the sliding glass panel is limited to a plurality of restricted positions with respect to the aperture, wherein each restricted position has at least one bus bar on the sliding glass panel overlapping one of the bus bars on the fixed glass panel to provide capacitive coupling between the overlapping bus bars of RF signals impinging on the horizontal traces; and an antenna coupler connected to a bus bar on the fixed glass panel to transmit the RF signals to an RF receiver.

11. The apparatus of claim 10 wherein the restricted positions include a closed position and a maximum open position.

12. The apparatus of claim 11 wherein the restricted positions further include a predetermined partially-open position.

13. The apparatus of claim 10 further comprising a rail system mounting the sliding glass panel to the fixed glass panel including a powered actuator for controlling movement of the sliding glass panel, wherein the powered actuator is driven in a manner such that the sliding glass panel is stopped only at the restricted positions.

14. The antenna system of claim 10 further comprising a rail system mounting the sliding glass panel to the fixed glass panel, wherein the rail system permits manually-controlled sliding of the sliding glass panel, and wherein the rail system includes a mechanical interlock engaging at the restricted positions to indicate proper placement at a restricted position.

\* \* \* \* \*